W. J. P. MOORE.
UNIVERSAL JOINT.
APPLICATION FILED JUNE 19, 1915.
1,232,829.
Patented July 10, 1917.
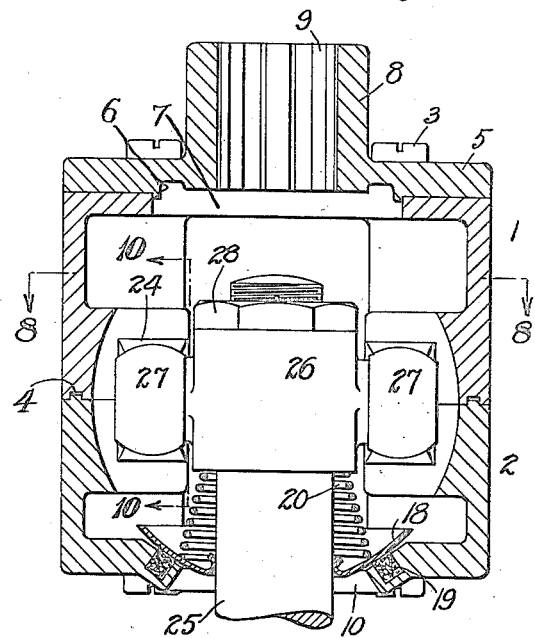
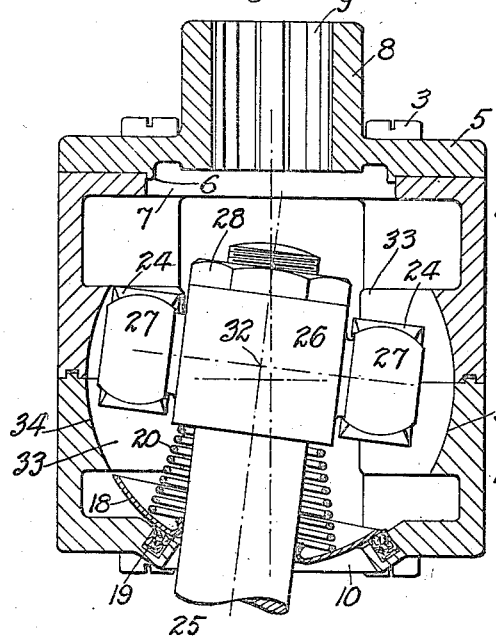
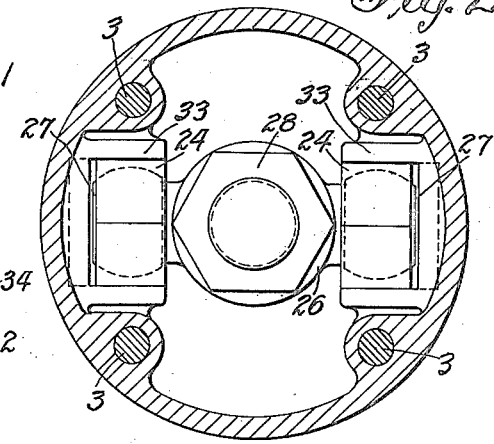
Inventor
William J. P. Moore,
per Fred L. Chasker,
Atty.

UNITED STATES PATENT OFFICE.

WILLIAM J. P. MOORE, OF NEW YORK, N. Y.

UNIVERSAL JOINT.

1,232,829.     Specification of Letters Patent.     Patented July 10, 1917.

Application filed June 19, 1915. Serial No. 35,018.

*To all whom it may concern:*

Be it known that I, WILLIAM J. P. MOORE, a citizen of the United States, residing at New York, in the county of New York and State of New York, have invented certain new and useful Improvements in Universal Joints, of which the following is a specification, reference being had therein to the accompanying drawing.

My invention refers to certain novel and useful improvements in universal joints for connecting the ends of shafts or other mechanical parts for transmitting power from one to the other, and likewise in other similar kinds of mechanism where it is desirable to have a joint capable of allowing motion to be communicated from a driving to a driven element when the elements approach each other at various angles. The object of my invention is to permit a wider range of applicability of the joint structure to a variety of mechanical combinations and make the joint more universally adaptable than is possible with other connections now in common use, thereby enabling lines of shafting to be connected for the impartation of motion when such lines vary in their location and axial position within wide limits; and the invention further comprises numerous details and peculiarities in the construction, arrangement and combination of parts, substantially as will be hereinafter described and then more particularly pointed out in the claims.

In the accompanying drawing illustrating my invention:

Figure 1 is a vertical section of my improved universal joint;

Fig. 2 is a horizontal sectional plan on the line 8, 8 of Fig. 1;

Fig. 3 is a vertical section similar to the section of Fig. 1 but showing the parts in a different position.

Similar characters of reference designate corresponding parts throughout the different figures of the drawing.

My improved joint comprises essentially a box or casing composed of sections 1 and 2 secured together by four or more bolts 3, the edges of the sections preferably having a tongue and groove connection 4. The sections are hollow and open at the sides or ends to permit the entrance of the shaft members or other parts which the joint is designed to couple together. The section 1 of the casing has a cover plate 5 flanged on one side at 6 to enable it to be seated closely and tightly within the opening 7 in said section 1, said cover plate being held in place by the aforesaid bolts 3, and this cover 5 is moreover formed with a central tubular boss 8 which is internally grooved or otherwise channeled at 9 to permit the introduction thereinto and connection therewith of one of the shaft members with which the universal joint is employed. The casing section 2 has an opening 10 directly opposite to the opening 7, through which opening 10 another shaft member or mechanical element 25 is introduced, as I shall presently more fully explain.

My present invention is adapted to those cases where lines of shafting which are off center relatively to each other and whose axes never coincide, are brought together to be coupled for joint revolution. The center of rotation of the cross-head at 32 is removed from the plane passing through the axis of the other shaft, the invention thus being adaptable to those cases where the lines of shafting, while contiguous and adapted to be connected for joint operation, never coincide in any way, and, hence, it is necessary to provide means whereby the universal joint may have its elements adjustable so as to provide for these special cases.

25 denotes a shaft which enters the casing through the opening 10 and carries a cross-head 26 having spherical or partly spherical trunnions 27 projecting at each side of the cross-head 26. The shaft 25 is secured to cross-head 26 by passing through the same and being securely held by the nut 28. The spherical or globular trunnions 27 are held within blocks 24, each block consisting of two halves, which two halves together constitute a square block situated neatly and closely, though with a sliding fit, between the opposing faces of the vertical flanges 33, which are formed integral with the sides of the casings 1 and 2. These sides between the vertical projections 33 are curved at 34. The blocks 24 moreover, not only have a vertical adjustment between the faces 33 up or down at either end of the cross-head 26, but also the cross-head, its shaft and the trunnions may all be moved bodily toward one of the faces 34 and away from the other, or, in other words, the box consisting of the sections 1 and 2 may be applied to a shaft such as shaft 25 and its cross-head 26, when the latter are in the position that will necessitate the trunnions occupying positions where one of them will be elevated higher than the other, and where one will be much closer than the other to its contiguous face 34, the joint, therefore, being adapted for use in those locations where the center 32 of rotation of the cross-head lies at some distance outside of the plane passing through the longitudinal axis of the opposite line of shaft, with which this eccentric line is to be coupled for mutual operation. It is obvious moreover that there may be a great many different positions for the shaft 25, not only with respect to the angle at which it approaches the other line of shafting, and at which it passes into the casing through the opening 10, but with relation to all the other parts, all of which changes are provided for by the provision of ample space between the vertical guides 33 between which the trunnion-carrying boxes 24 have a liberal amount of endwise as well as up and down play. In this invention, a spring pressed cover 18 is employed for the purpose of excluding dust and retaining oil or lubricant within which the parts in the main casing are permitted to revolve, but the sleeve 21 in this case is usually omitted.

Many changes in the precise construction, operation and arrangement of the various parts may be made without exceeding the scope of my invention, and I reserve the liberty of making all such variations in the details as the exigencies or advantages of individual cases may necessitate or recommend.

Having thus described my invention, what I claim as new and desire to secure by Letters Patent, is:

1. In a device of the class described, the combination of a casing having parallel guides on the inner wall thereof, means for connecting a mechanical element to said casing, a mechanical element entering the casing opposite to said means, a head on the latter element having globular trunnions, and floating sectional bearings for said trunnions, which bearings operate in the aforesaid guides.

2. In a device of the class described, the combination of a casing having parallel guides on the inner wall thereof, a mechanical element, means for connecting it to the casing, a second mechanical element entering the casing, a head on said latter element having lateral trunnions formed with curved faces, and sectional floating bearings for said trunnions, which bearings are provided with curved cavities for receiving the trunnions, and which bearings operate in the aforesaid guides.

3. In a device of the class described, the combination of a casing having parallel guides on the inner wall thereof, a mechanical element, means for connecting it to the casing, another mechanical element entering the casing, a cross-head on said element having lateral trunnions of substantially spherical form, and floating sectional bearings receiving said trunnions and working in the aforesaid guides.

4. In a device of the class described, the combination of a casing having parallel guides, a shaft, means for connecting it to the casing, a second shaft entering the casing, a cross-head on said second shaft having lateral globular-shaped trunnions, sectional boxes inclosing said trunnions loosely, said boxes being arranged to occupy different positions between the parallel guides according to the angularity of the shafts, said guides allowing the trunnion boxes to be shifted in the direction of the axial line of the cross-head as well as the axial line of the shaft.

5. In a device of the class described, the combination of a casing having parallel guides on the interior thereof, a mechanical driven or driving element connected with the casing, a second driving or driven element entering an opening in the casing, a cross-head on said latter element having globular trunnions, said globular trunnions being adapted to occupy a variety of different positions between the aforesaid parallel guides accordingly as the mechanical element which enters the casing enters at any one of the various angles to the axial line of the other one, and floating bearings carrying said projections and movable between the parallel guide, together with sectional boxes loosely inclosing the globular trunnions.

In testimony whereof I affix my signature.

WILLIAM J. P. MOORE.